April 28, 1925.

J. R. BARNHART

RECTIFIER

Filed Oct. 6, 1920    3 Sheets-Sheet 1

1,535,088

Inventor
Joseph R. Barnhart
By Hull Smith Brock & West
Attys.

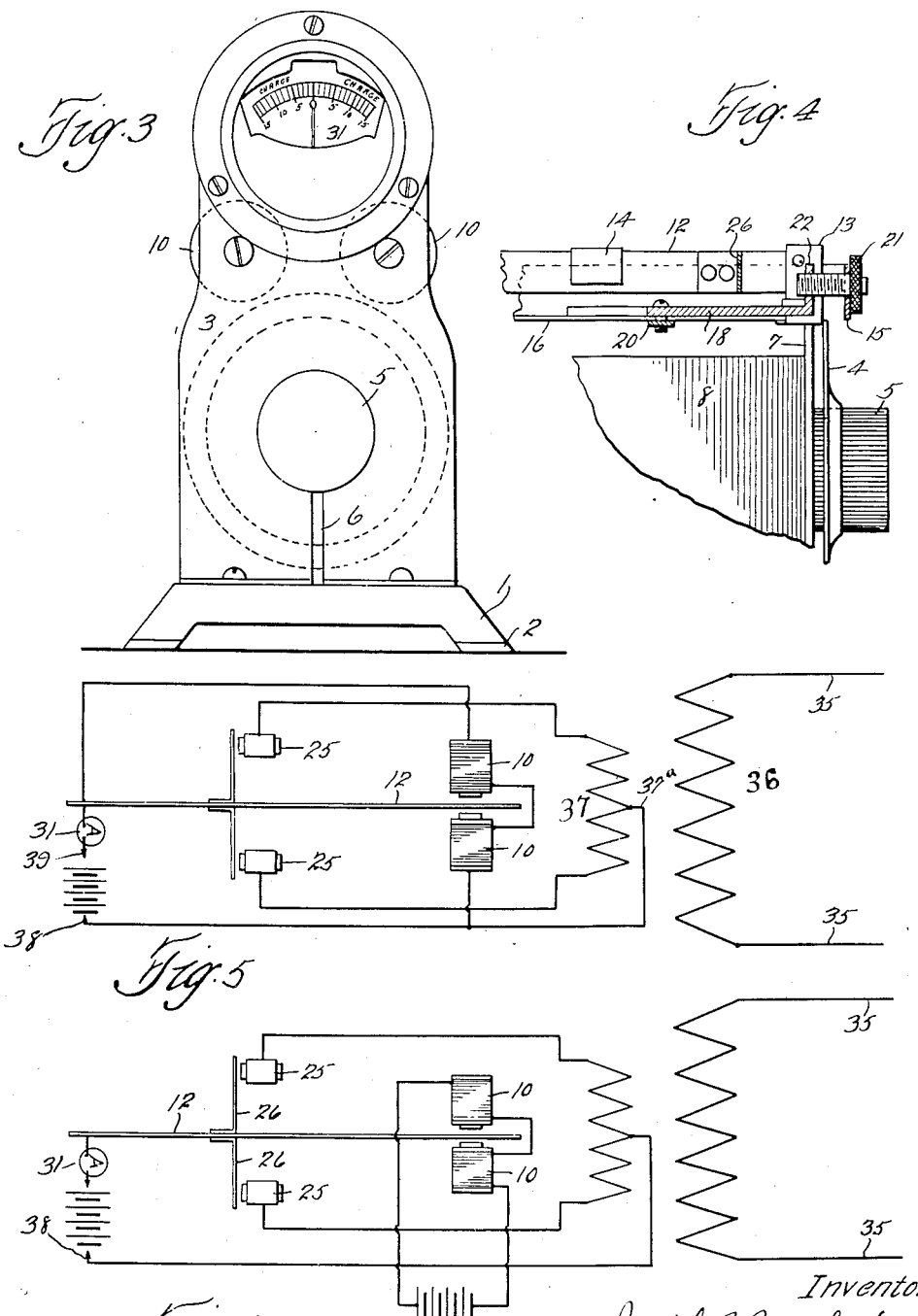

April 28, 1925.
J. R. BARNHART
RECTIFIER
Filed Oct. 6, 1920
1,535,088
3 Sheets-Sheet 3
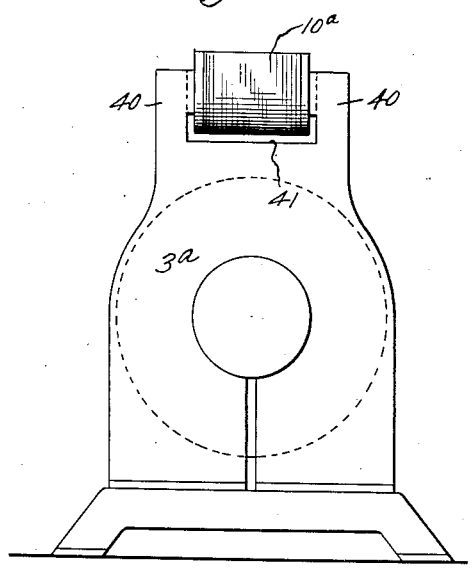
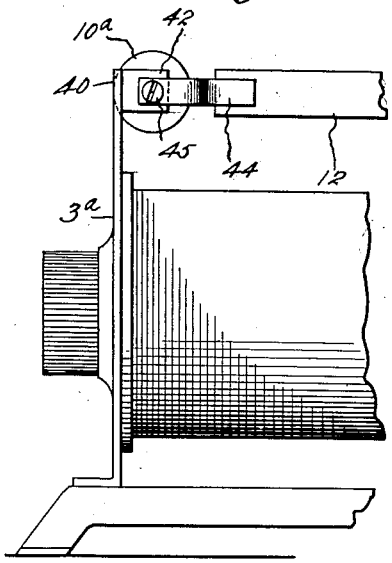
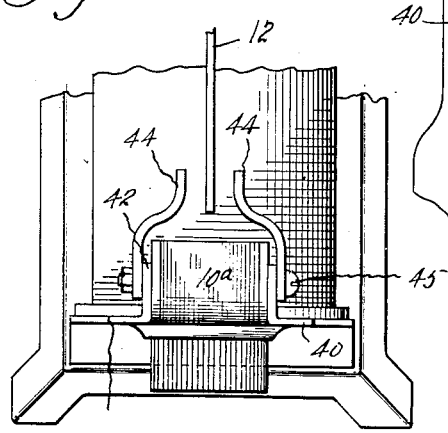
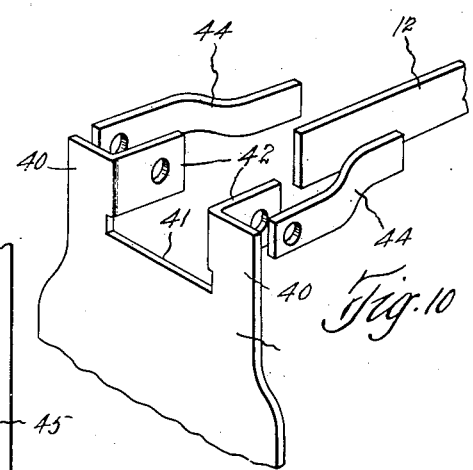
Inventor
Joseph R. Barnhart
By Hull Smith Brock & West.
Attys.

Patented Apr. 28, 1925.

1,535,088

UNITED STATES PATENT OFFICE.

JOSEPH R. BARNHART, OF CLEVELAND, OHIO, ASSIGNOR TO WALTER M. SCOTT, OF CLEVELAND, OHIO.

RECTIFIER.

Application filed October 6, 1920. Serial No. 415,090.

*To all whom it may concern:*

Be it known that I, JOSEPH R. BARNHART, a citizen of the United States, residing at Cleveland, in the county of Cuyahoga and State of Ohio, have invented a certain new and useful Improvement in Rectifiers, of which the following is a full, clear, and exact description, reference being had to the accompanying drawings.

This invention relates to rectifiers for converting alternating current into unidirectional current for the purpose of charging storage batteries, although it is also applicable for use in other relations, such as in electrochemical industry. The main object of the invention is the provision of a small, simple, inexpensive, and reliable instrument which can be used with safety and economy by those unskilled in electricity for the purpose of charging their own storage batteries such as are frequently used in the starting and lighting of automobiles; other objects are the provision of a new and improved rectifier of self determining polarity; the provision of a rectifier which shall be self-starting when applied in circuit with both an alternating current and a direct current of predetermined polarity, yet stopping automatically upon the disconnection or opening of either circuit, while leaving the other circuit entirely or substantially open; the provision of a rectifier of the mechanical type having improved brush holding and adjusting features; the provision of a rectifier having an accurate ammeter fitted into its frame; while further objects and advantages of the invention will become apparent as the description proceeds.

Figure 1:
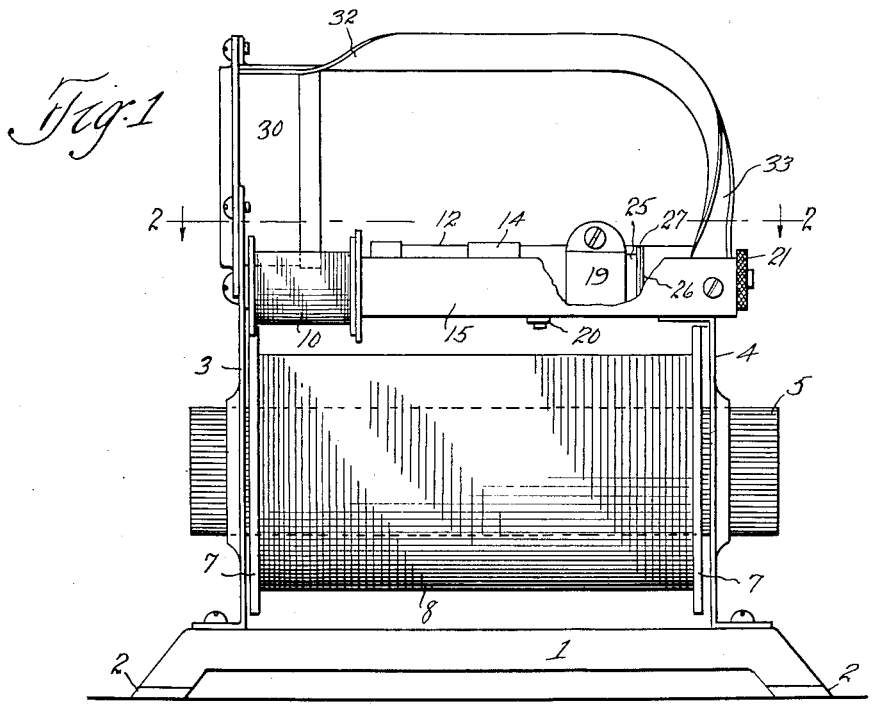
Figure 2:
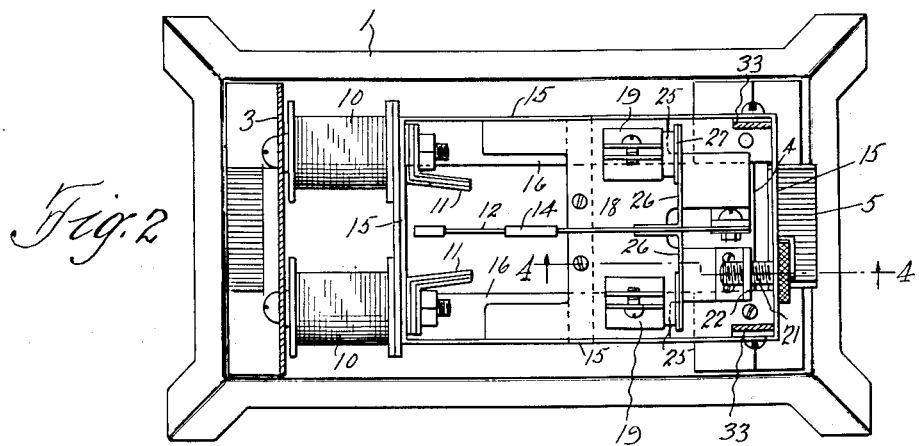

In the drawings accompanying and forming a part of this application I have illustrated one embodiment of my invention, although it will be understood that this drawing is intended to be illustrative only and not limiting upon me. Fig. 1 represents a side elevation of the complete instrument; Fig. 2 is a sectional view taken upon the line 2—2 of Fig. 1 and looking downwardly; Fig. 3 is a left hand elevation of the instrument shown in Fig. 1; Fig. 4 is a detail view corresponding to the broken line 4—4 of Fig. 2 and looking in the direction of the arrows; Fig. 5 is diagrammatic view showing the circuits; Fig. 6 is a diagrammatic view showing a different circuit arrangement; and Figs. 7 to 10 inclusive illustrate a modified device.

Describing by reference characters the parts shown in these drawings, my improved rectifier comprises a rectangular base 1 supported on insulating feet 2 and having adjacent its ends the upright iron pole members 3 and 4, apertured for the reception of the magnetic core 5 which is closely embraced thereby and preferably consists of a bundle of soft iron wires. Each of these pole pieces preferably consists of a piece of sheet iron, severed by a kerf 6 at one side of this core to prevent eddy currents. Inside these pole pieces the core is surrounded by the heads 7—7 between which is wound the energizing coil 8 which preferably comprises distinct primary and secondary coils constituting a transformer, although an autotransformer can be employed, or even a mere magnetizing winding.

Secured to the pole piece 3 at a point above the coil are a pair of longitudinally-arranged direct current magnets 10—10 arranged one at each side of the center line of the device. The cores of these magnets make magnetic contact at one end with the pole piece 3 and at their opposite ends are provided with pole pieces 11—11 which face each other upon opposite sides of a vibrating reed 12 carried by the pole piece 4. In the present embodiment this last pole piece is provided with an integral upstanding ear 13 to which the reed 12 is attached. This reed is made of magnetically permeable material such as spring steel and is preferably provided with a slidable weight 14 by which it can be tuned.

Upon each side of this reed I have provided a rigid slideway, here consisting of a rectangular frame 15 of non-magnetic material such as brass having at its two sides the inwardly turned horizontal flanges 16. One end of this frame is rigidly attached to the pole piece 4 and its opposite end to the magnets 10. Slidably mounted inside this frame and resting on the flanges 16 is a carriage 18, preferably of insulating material such as hard rubber or bakelite, having secured to its upper surface a pair of brush holders 19—19 arranged one at each side of the reed and parallel thereto. This carriage is held down by a suitable cross-piece 20 which extends beneath the flanges 16, and is moved longitudinally by means of a screw 21 carried by the frame and engaging an upturned ear 22 attached to the carriage.

Secured to each brush holder is a brush 25, preferably of carbon, and projecting from each side of the reed 12 is an arm 26 having at its outer end a contact plate 27 adapted to engage one of said brushes. These arms 26—26 are in line with each other and are perpendicular to the reed, being thus enabled to make and break contact alternately as said reed is vibrated. By adjusting both brushes simultaneously into contact with their respective arms when the reed is at rest and then withdrawing the carriage slightly from said arms by turning the screw 21, it will be seen that the contact at the opposite sides will always be equal. Secured to the upper end of the pole piece 3 is the hollow magnetic shell 30, containing the works of an ammeter 31; secured to the top of this shell is one end of a handle 32 whose opposite end is branched as shown at 33 and secured to the frame 15. This handle can be made of any cheap material, even iron, its magnetic permeability being unimportant.

The wiring diagram is shown in Fig. 5, wherein 35—35 represent the alternating current mains which are connected at opposite ends to the primary winding 36. 37 represents the secondary winding, which is generally made with a much smaller number of turns than the primary winding and has each of its ends attached to one of the brushes 25 and its mid-point 37ª attached to one of the battery terminals 38. The other battery terminal 39 is attached to the reed 12 through smelter 31, while the direct current magnets 10—10 are attached as a shunt between said battery terminals.

In Figs. 7 to 10 inclusive, I have illustrated a slightly modified and simplified form of my device in which the pole piece 3ª is formed at its upper part with a pair of upright ears 40—40 spaced apart to define a notch 41 and having margins bent at right angles and apertured to form the lugs 42 between which is secured the direct current magnet 10ª. Outside of each of the lugs a pole piece 44 is provided, the parts being held together by a bolt 45 passing through the magnet core. The reed 12 projects between these pole pieces in the usual manner.

Upon attaching the device to the alternating mains and prior to attaching a battery at the point indicated, the sole effect will be to draw sufficient power from the alternating mains to magnetize the core. Upon attaching a storage battery between the terminals 38 and 39 the back-electromotive force thereof produces such a magnetic field as serves, in co-operation with the alternating magnetic field, to produce a vibration of the reed 12 in synchronism therewith, which being the same as the pulsations of current in the secondary coil causes those pulsations to augment the magnetizing effect of the direct current and also to charge the battery at a rate depending upon the excess of current produced by the transformer over that required to energize the coils 10—10. The latter are generally wound to produce a fairly high resistance say 40 ohms for a six volt rectifier or 160 ohms for a twelve volt rectifier. The reed is self starting. If the alternating current be shut off it stops in central position, thereby preventing any discharge of the battery excepting through the high resistance of the coils 10—10. If the battery be removed prior to disconnecting the alternating current, the only result is to reduce the consumption of the alternating current substantially to zero. When an ammeter is employed as illustrated herein, the rate of charging is shown accurately thereby, notwithstanding the magnetic path in which the ammeter is located, its magnetic shell serving to shield the interior works from the disturbing influence.

It will be understood that the magnets 10—10 need not be connected in the same circuit with the terminals 38, 39, but may be energized by a separate circuit if desired, for example by the use of a dry-battery as indicated at 40 in Fig. 6. This enables the rectifier to be employed in situations, such as electro-plating or other electro-chemical work, where the receiving circuit has no initial polarity.

It will be understood that many changes in construction can be made within the scope of my invention and that I do not limit myself to any of the details herein shown or described except as the same are specifically recited in the annexed claims.

Having thus described my invention, what I claim is:

1. In a device of the character described, the combination with a vibratory reed, of a pair of lateral arms projecting from opposite sides thereof, contact members carried by said arms, a carriage movable longitudinally of said reed, and a pair of brushes carried by said carriage, one in line with each contact member.

2. In a device of the character described, the combination with a vibratory reed, of a pair of lateral arms projecting from opposite sides thereof, contact members carried by said arms, a carriage movable longitudinally of said reed, and a pair of brushes carried by said carriage, one in line with each contact member, said brushes being also adjustable longitudinally of said reed independently of each other.

3. In a device of the character described, the combination with a vibratory reed, of a pair of lateral arms projecting from opposite sides thereof, contact members carried by said arms, a brush-holder located in line with each contact member, a brush in each brush-holder, means for moving said brush-holders simultaneously longitudinally of said reed, and means for adjusting said brushes independently of each other in the same direction.

4. In a rectifier, in combination, an alternating current coil having a core and pole pieces, a pair of parallel rails supported between said pole pieces, a carriage slidably mounted on said rails, brushes on said carriage, a vibratory magnetic reed carried by one pole piece and extending toward the other pole piece between said brushes, a pair of lateral arms carried by said reed, one in front of each brush, a pair of supplementary pole pieces carried by such other pole piece, one on each side of said reed, and a direct current winding operatively associated with said supplementary pole pieces.

5. In a device of the character described, the combination with a vibratory reed, of a lateral arm carried thereby adjacent to its fixed end, a contact member of solid conducting material carried by said arm, and a second contact member also of solid conducting material adapted to contact with said first member as said reed vibrates, said second member being adjustable longitudinally of said reed.

In testimony whereof, I hereunto affix my signature.

JOSEPH R. BARNHART.